(12) United States Patent
Nagamine et al.

(10) Patent No.: US 11,538,503 B1
(45) Date of Patent: Dec. 27, 2022

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventors: Takeshi Nagamine, Kanagawa (JP); Kiyoshi Iida, Kanagawa (JP); Hirotake Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/550,145

(22) Filed: Dec. 14, 2021

(30) Foreign Application Priority Data

Aug. 2, 2021 (JP) .............................. JP2021-126969

(51) Int. Cl.
| | | |
|---|---|---|
| *G11B 27/34* | (2006.01) | |
| *G06F 3/01* | (2006.01) | |
| *G06V 10/24* | (2022.01) | |
| *G06V 20/40* | (2022.01) | |
| *G06V 40/20* | (2022.01) | |

(52) U.S. Cl.
CPC .............. *G11B 27/34* (2013.01); *G06F 3/017* (2013.01); *G06V 10/245* (2022.01); *G06V 20/46* (2022.01); *G06V 40/20* (2022.01)

(58) Field of Classification Search
None
See application file for complete search history.

(56) References Cited

U.S. PATENT DOCUMENTS

2002/0178453 A1* 11/2002 Jun ...................... G11B 27/105
725/102
2011/0293252 A1* 12/2011 Greenfield ......... H04N 21/4325
386/350

FOREIGN PATENT DOCUMENTS

| JP | 2006-252208 A | 9/2006 |
| JP | 2019-047447 A | 3/2019 |

* cited by examiner

*Primary Examiner* — Hung Q Dang
(74) *Attorney, Agent, or Firm* — Sughrue Mion, PLLC (57) ABSTRACT

An information processing apparatus includes a processor configured to: record a motion of a user made until a video pause instruction to pause displayed video is given; and display a still image in the video displayed at a second time point earlier than a first time point, the first time point being a time point at which the video pause instruction is received, the second time point being a threshold time point at which acceleration involved with the motion of the user first exceeds a predetermined threshold and which is a most recent threshold time point.

20 Claims, 9 Drawing Sheets

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-126969 filed Aug. 2, 2021.

BACKGROUND

(i) Technical Field

The present disclosure relates to an information processing apparatus, an information processing method, and a non-transitory computer readable medium.

(ii) Related Art

Japanese Unexamined Patent Application Publication No. 2019-047447 discloses a video recording system including a recording apparatus that records moving image data and a remote apparatus that is communicably connected to the recording apparatus via a network. The recording apparatus includes a recording unit, a moving image transmission unit, and a still-image transmission unit. The recording unit records the moving image data. The moving image transmission unit converts the moving image data recorded in the recording unit to low-quality moving image data having a lower image quality and transmits the moving image data to the remote apparatus. In response to an image request from the remote apparatus, the still-image transmission unit generates requested still image data from the moving image data recorded in the recording unit. The still image data has a higher image quality than the image quality of the low-quality moving image data. The still-image transmission unit then transmits the still image data to the remote apparatus. The remote apparatus includes a display that displays an image, a moving image reproduction unit, a frame image display, an image requesting unit, and a still-image display. The moving image reproduction unit reproduces and displays a moving image represented by the low-quality moving image data on the display surface of the display while receiving the low-quality moving image data transmitted from the recording apparatus. In response to receiving input of an instruction by a user given for the moving image being reproduced, the frame image display displays, on the display surface of the display, frame images constituting a moving image reproduced in a period from a time point a predetermined time before the time point when the instruction input is received to the time point when the instruction input is received. In response to the user selecting one of the frame images, the image requesting unit transmits, to the recording apparatus, an image request for a high-quality image representing the selected frame image. In response to the image request, the still-image display receives the still image data transmitted from the recording apparatus and displays a high-quality still image represented by the still image data on the display surface of the display.

Japanese Unexamined Patent Application Publication No. 2006-252208 discloses an annotation application device including a display controller and an application unit. The display controller causes a symbol tracking a moving image or a person appearing in the moving image to be displayed, on the basis of an operation performed on the symbol. The application unit applies an annotation to the moving image.

SUMMARY

Advancement of network technology and devices has enabled users in remote places to communicate with each other with audio and video. The audio and video communication is also useful for remote maintenance in which support is provided from a remote place while video of a specific object in a maintenance place is being watched. In the remote maintenance, communication is mainly focused on which part of the specific object displayed on the screen is to be operated and how the part is to be operated.

In the remote maintenance, a user sometimes intends to watch a still image in video paused at the moment when a support target object or a specific part of the object is clearly displayed. However, when the user performs an operation for pausing the video to give the support, a time lag arises on occasions between a time point when the user intends to pause the video and a time point when a video pause instruction is received, thus preventing the video from being paused at the time point intended by the user.

Aspects of non-limiting embodiments of the present disclosure relate to an information processing apparatus, an information processing method, and a non-transitory computer readable medium that are enabled to display, as a still image, a video frame displayed when the user intends pausing, in such a manner as to go back from a time point when the video pause instruction is actually received.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: record a motion of a user made until a video pause instruction to pause displayed video is given; and display a still image in the video displayed at a second time point earlier than a first time point, the first time point being a time point at which the video pause instruction is received, the second time point being a threshold time point at which acceleration involved with the motion of the user first exceeds a predetermined threshold and which is a most recent threshold time point.

BRIEF DESCRIPTION OF THE DRAWINGS

Exemplary embodiments of the present disclosure will be described in detail based on the following figures, wherein.

DETAILED DESCRIPTION

Hereinafter, examples of exemplary embodiments according to the disclosed technology will be described in detail with reference to the drawings.

First Exemplary Embodiment

Figure 1:
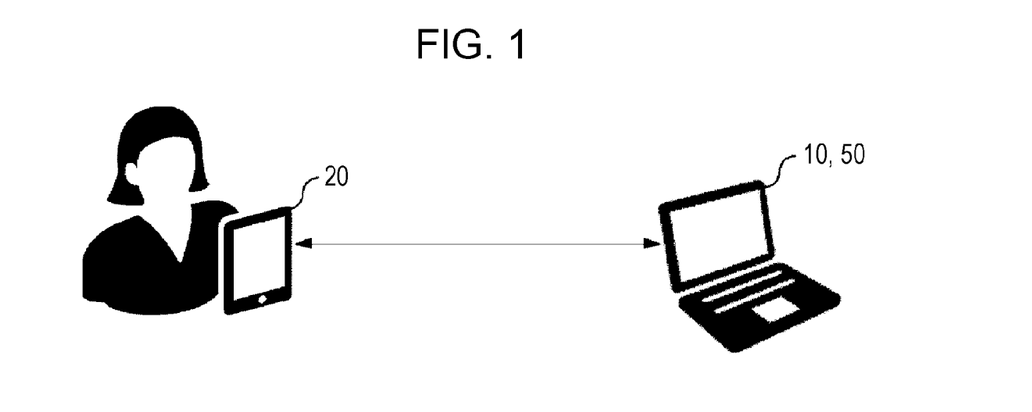
FIG. 1 is an overall view schematically illustrating an information processing system.

FIG. 1 is an overall view schematically illustrating an information processing system according to this exemplary embodiment including an information processing apparatus 10. As illustrated in FIG. 1, the information processing system according to this exemplary embodiment includes the information processing apparatus 10 and an engineer terminal 20, and the information processing apparatus 10 and the engineer terminal 20 are connected to each other. The information processing apparatus 10 and the engineer terminal 20 are connected to a network and are able to communicate with each other via the network; however, this is not illustrated in FIG. 1. For example, the Internet, a local area network (LAN), or a wide area network (WAN) applies to the network.

Figure 2:
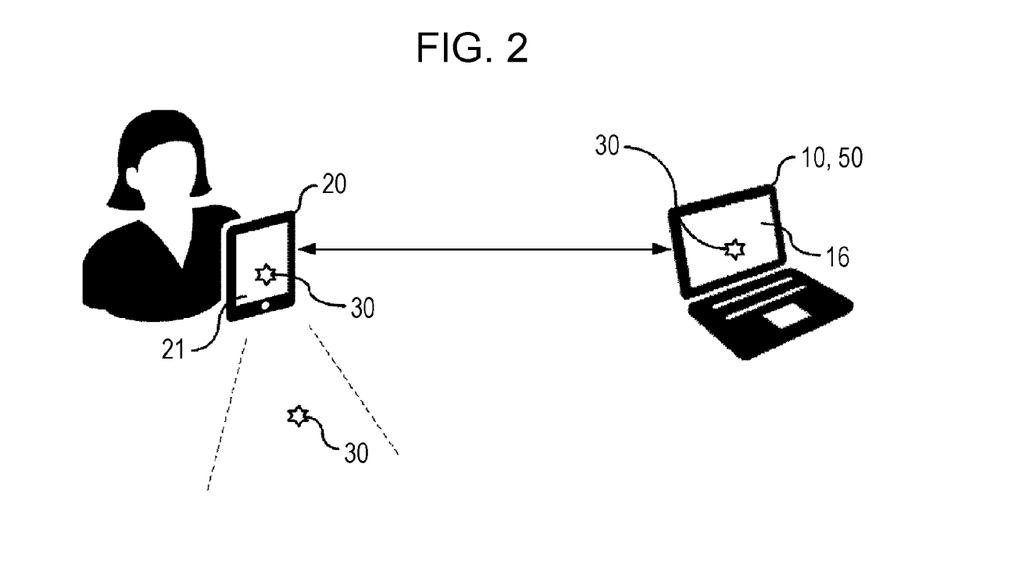
FIG. 2 is a view illustrating an example of video communication between an engineer and an expert.

The information processing apparatus 10 according to this exemplary embodiment is used for remote maintenance, for example, when an expert gives an instruction about a specific object to an engineer in a remote place. FIG. 2 is a view illustrating an example of video communication between the engineer and the expert performed by using the information processing apparatus 10. As illustrated in FIG. 2, the engineer uses the engineer terminal 20 and takes video of an object 30 for which an instruction from the expert is required. The video taken with the engineer terminal 20 is transmitted to the information processing apparatus 10 via the network described above. Video displayed on a display 21 or the like of the engineer terminal 20 used to take video of the object 30 is also displayed on a monitor 16 of the information processing apparatus 10. The expert gives an instruction or the like to the engineer while watching the object 30 in the video displayed on the monitor 16 of the information processing apparatus 10.

In FIG. 2, the engineer terminal 20 is represented as a smartphone. However, the engineer terminal 20 is not limited to a tablet terminal. The information processing apparatus 10 is represented as a general compute terminal; however, the information processing apparatus 10 may be a tablet terminal such as a smartphone and is not limited to the general compute terminal. The information processing apparatus 10 and the engineer terminal 20 respectively include, for example, the monitor 16 and the display 21 that each serve as an image output device for displaying video and images. The monitor 16 and the display 21 serving as the image output device may also have a function of an input device such as a touch panel. The image output device and the input device are not necessarily required to be included in each of the information processing apparatus 10 and the engineer terminal 20 and may be connected as external devices to the information processing apparatus 10 and the engineer terminal 20. Further, a target device for output such as screen displaying by the information processing apparatus 10 and the engineer terminal 20 is not limited to a display or the like and may be virtual reality (VR) glasses, or the like.

Figure 3:
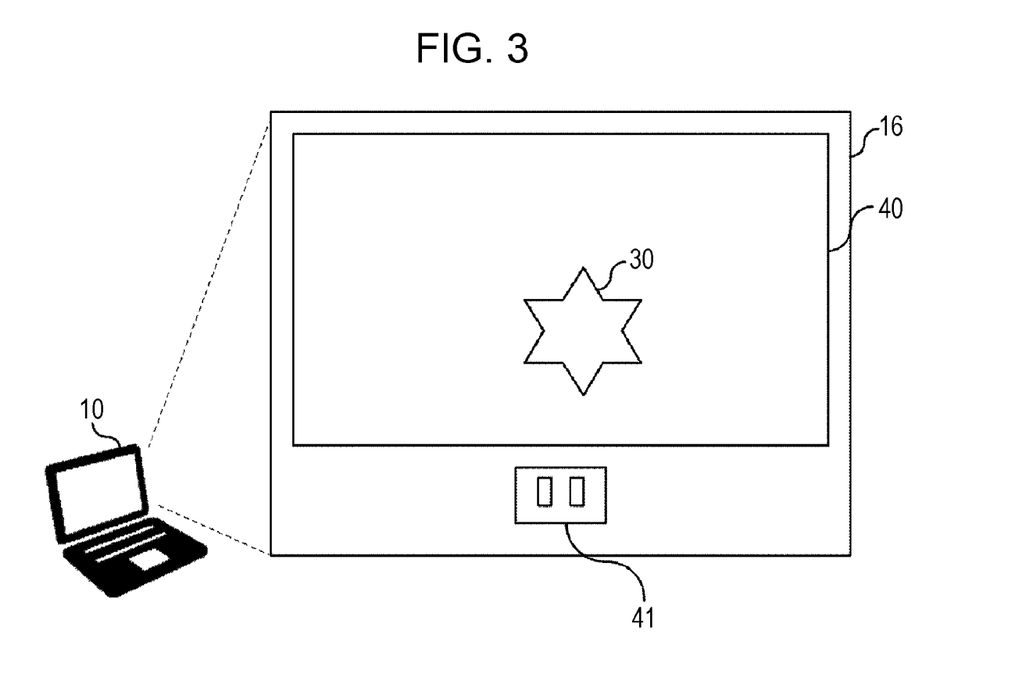
FIG. 3 is a view illustrating an example of the displaying of a screen by an information processing apparatus according to a first exemplary embodiment.

FIG. 3 is a view illustrating an example of the displaying of a screen by the information processing apparatus 10 according to the first exemplary embodiment. The video received from the engineer terminal 20 is displayed on the monitor 16 of the information processing apparatus 10. A video pause button 41 is provided below a display area 40 where the video received from the engineer terminal 20 is displayed. The expert visually observes the object 30 in the video received from the engineer terminal 20 and pauses the video, for example, when the expert intends to apply, to the video, an annotation such as a character or a symbol as supplementary information for giving an instruction more appropriately. In addition, in a case where the expert intends to verify the object 30 carefully, where the expert intends to verify the object 30 at a moment when the object 30 is clearly displayed, or other cases, the expert pauses the video by performing an operation such as pressing or tapping the video pause button 41.

Figure 4:
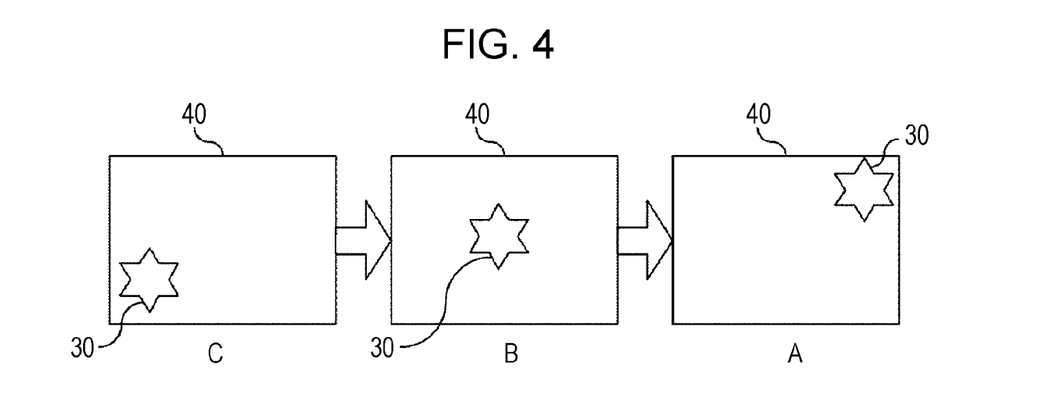
FIG. 4 is a view illustrating an example of video changes at respective time points.

However, the video changes serially, and thus a time lag arises on occasions between a time point when the expert intends to pause the video (hereinafter, referred to as a pause intention time point) and a time point when the information processing apparatus 10 actually receives the pressing or the like of the video pause button 41. FIG. 4 is a view illustrating an example of video changes at respective time points. FIG. 4 illustrates the video changes over time from a time point C to a time point A through a time point B. The video frames at the time points C, B, and A in FIG. 4 each include the object 30, but the location and the angle of the object 30 are changed over time. In the video illustrated in FIG. 4, the object 30 is located approximately in the center portion of the screen at the time point B, located in the lower left corner of the screen at the time point C, and located in the upper right corner of the screen at the time point A. Even if the expert intends to pause the video at the time point B when the object 30 is easier to watch, a video frame at the time point A slightly after the time point B is displayed as a still image on occasions, depending on the time point of actual pressing or the like of the video pause button 41. The information processing apparatus 10 in this exemplary embodiment displays, as a still image, a video frame displayed at the pause intention time point, in such a manner as to go back from the time point when the video pause instruction is actually received from the expert. In the following description, the expert is referred to as a user.

Figure 5:
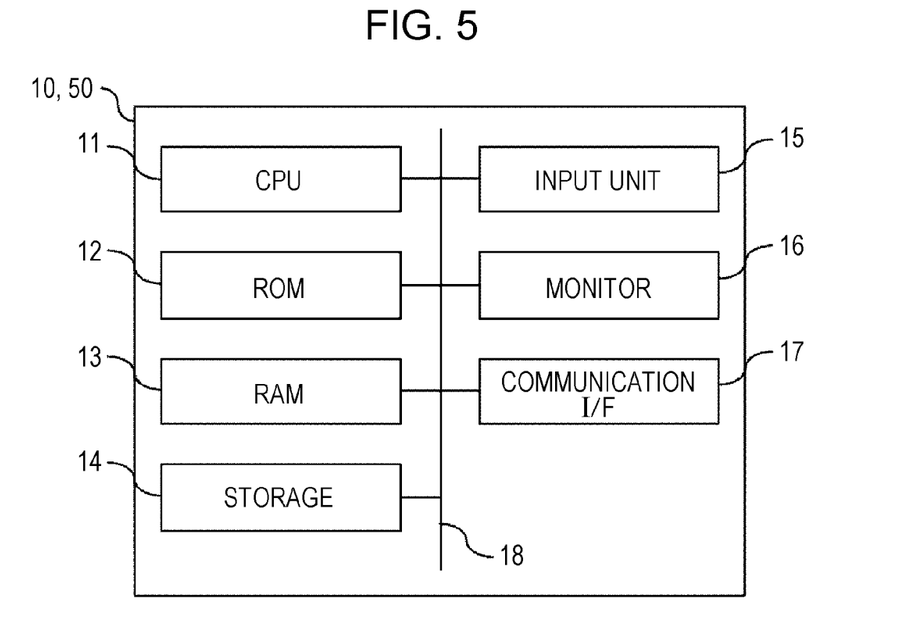
FIG. 5 is a block diagram illustrating the hardware configuration of the information processing apparatus.

The configuration of the information processing apparatus 10 will be described with reference to FIG. 5. FIG. 5 is a block diagram illustrating an example of the hardware configuration of the information processing apparatus 10 according to this exemplary embodiment. An aspect in which the information processing apparatus 10 according to this exemplary embodiment is a terminal such as a personal computer will be described taken as an example; however, the present disclosure is not limited to this aspect.

As illustrated in FIG. 5, the information processing apparatus 10 according to this exemplary embodiment includes a central processing unit (CPU) 11, a read only memory (ROM) 12, a random access memory (RAM) 13, a storage 14, an input unit 15, the monitor 16, and a communication interface (I/F) 17. The CPU 11, the ROM 12, the RAM 13, the storage 14, the input unit 15, the monitor 16, and the communication I/F 17 are connected to each other via a bus 18. The CPU 11 is an example of a processor.

The CPU 11 performs overall control of the information processing apparatus 10. The ROM 12 stores various programs including an information processing program used in this exemplary embodiment, data, and the like. The RAM 13 is used as a work area when a program is run. The CPU 11 executes a process for displaying an image and a character string in such a manner as to load an appropriate program stored in the ROM 12 into the RAM 13 and runs the program. The storage 14 is, for example, a hard disk drive (HDD), a solid state drive (SSD), or a flash memory. The storage 14 may store the information processing program and the like. The input unit 15 includes a mouse, a keyboard, or the like that receives character input or the like. The monitor 16 is used to display a screen. The communication I/F 17 is used to perform data exchange.

Figure 6:
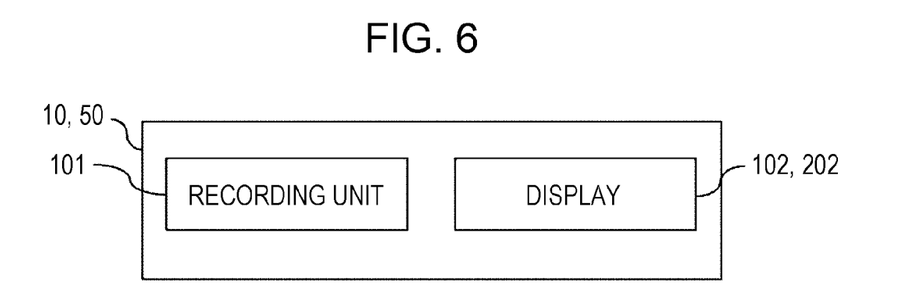
FIG. 6 is a block diagram illustrating the functional configuration of the information processing apparatus.

The functional configuration of the information processing apparatus 10 will then be described with reference to FIG. 6. FIG. 6 is a block diagram illustrating an example of the functional configuration of the information processing apparatus 10 according to this exemplary embodiment.

As illustrated in FIG. 6, the information processing apparatus 10 includes a recording unit 101 and a display 102 in the functional configuration. When running the information processing program, the CPU 11 thereby functions as the recording unit 101 and the display 102.

The recording unit 101 records motions of the user made until the user gives a video pause instruction to pause the video displayed in the display area 40 of the monitor 16.

Giving a video pause instruction to pause the video denotes performing an operation such as pressing or tapping by the user on the video pause button 41 in this exemplary embodiment.

The motions of the user are actions for the operation such as pressing or tapping the video pause button 41 with a peripheral device such as a touch pen used by the user. The motions of the user are recorded, for example, by using a motion sensor installed in advance in the peripheral device such as the touch pen used by the user. The recording of the motions of the user is not limited to recording in response to a three-dimensional movement change detected by the motion sensor installed in the touch pen. If the monitor 16 is a touch panel, the recording may be performed by using a capacitive touch system in which the monitor 16 responds to the approach of the touch pen to the monitor 16 or a method by which a change in the movement of a mouse pointer caused by a mouse operation is detected. If the information processing apparatus 10 is a tablet terminal, the motions of the user may be recorded in response to a change in movement detected by the motion sensor installed in the information processing apparatus 10. Further, the motions of the user may be recorded on the basis of a motion sensor installed in a wearable terminal worn by the user such as a smart watch terminal or a smart ring terminal.

The display 102 displays a still image in the video displayed at a second time point earlier than a first time point. The first time point is a time point at which the video pause instruction is received. The second time point is a threshold time point at which acceleration involved with the user's motions exceeds a predetermined threshold for the first time and which is the most recent threshold time point.

On the basis of changes of the acceleration involved with the user's motions recorded by the recording unit 101, the display 102 displays, as a still image, a video frame displayed at the pause intention time point, in such a manner as to go back from the time point when the video pause instruction is actually received.

The first time point is the time point at which the video pause instruction is received and thus at which the information processing apparatus 10 receives the pressing of the video pause button 41 by the user. The second time point is earlier than the first time point and is the threshold time point at which the acceleration involved with the user's motions exceeds the predetermined threshold for the first time and which is the most recent threshold time point. The second time point is presumed to be the time point at which the user actually intends to pause the video.

Figure 7:
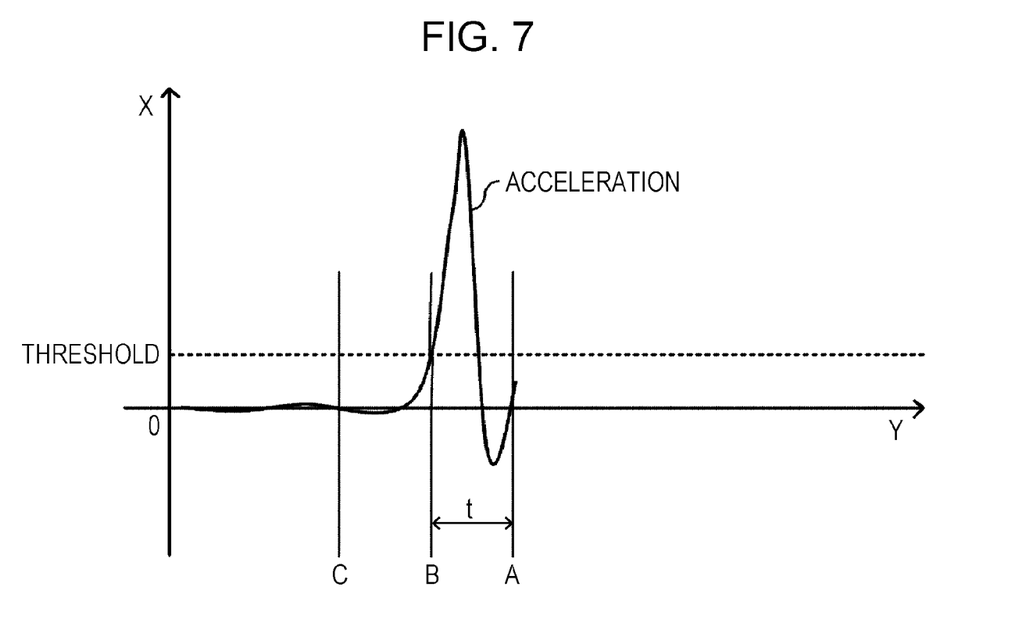
FIG. 7 is a graph illustrating an example of a method for detecting a time point when a user intends pausing.

FIG. 7 is a graph illustrating an example of changes of the acceleration involved with the user's motions recorded by the recording unit 101 and also illustrating an example of a method for detecting a pause intention time point. In FIG. 7, the X axis represents the level of the detected acceleration involved with the user's motions, and the Y axis represents the elapse of time.

As illustrated in the graph in FIG. 7, in a start period of the recording of the motions of the user, there is almost no change in the acceleration involved with the user's motions. However, the acceleration involved with the user's motions starts increasing at a certain time point and then lowers immediately after the acceleration reaches an increase peak.

In the following description, a series of motions made by the user to press the video pause button 41 with the touch pen is taken as an example. The user first holds the touch pen in their hand. The user then raises the touch pen, moves the touch pen near the video pause button 41, brings the touch pen into contact with the video pause button 41 appropriately, and lowers the touch pen off the video pause button 41.

The relation between the series of motions of pressing the video pause button 41 described above and the changes of the acceleration involved with the series of user's motions illustrated in FIG. 7 will be described. The time point when the user moves the touch pen near the video pause button 41 after raising the touch pen is presumed to be the time point when the user actually intends to pause the video. That is, the second time point is the time point B when the acceleration involved with the user's motions starts increasing rapidly. Further, as illustrated in FIG. 7, a time lag of time t arises between the time point B and the time point A, that is, the first time point, at which the information processing apparatus 10 receives the instruction to pause the video and actually pauses the video in response to the pressing of the video pause button 41 by the user.

However, regardless of whether the time lag t arises, the display 102 displays a still image in the video displayed at the second time point (time point B) earlier than the first time point (time point A). The second time point is the threshold time point at which the acceleration involved with the user's motions exceeds the predetermined threshold for the first time and which is the most recent threshold time point. As the threshold for detecting the time point B, that is, the second time point and for the acceleration involved with the user's motions, any value is settable.

The display 102 regards, as the second time point, the threshold time point at which the acceleration exceeds the threshold for the first time within a period from the first time point back to a third time point a predetermined time earlier than the first time point, and thus the display 102 displays the still image in the video.

It is possible that some users frequently make motions causing acceleration exceeding the threshold because they move the peripheral device, the wearable terminal, or the like any time without intending to pause the video even while they are watching the video (moving image). To address this, the display 102 limits a detection period to the period from the first time point back to the third time point the predetermined time earlier than the first time point, on the basis of the motions of the user recorded by the recording unit 101. The display 102 detects the acceleration involved with the user's motions that exceeds the threshold within the period. In the example in FIG. 7, for example, the third time point is the time point C, the threshold time point at which the acceleration involved with the user's motions exceeds the threshold for the first time after the time point C that is earlier than the time point A is the time point B. As the predetermined time from the first time point back to the third time point, any value is also settable.

The display 102 may reproduce the video from the time point when the still image is displayed. The display 102 may not only display the video frame displayed at a given time point as the still image but also further resume the reproduction of the video from the given time point when the video frame is displayed as the still image. To reproduce the video from the time point when the still image is displayed, a video reproduction button or the like disposed near the video pause button 41 is displayed.

Figure 8:
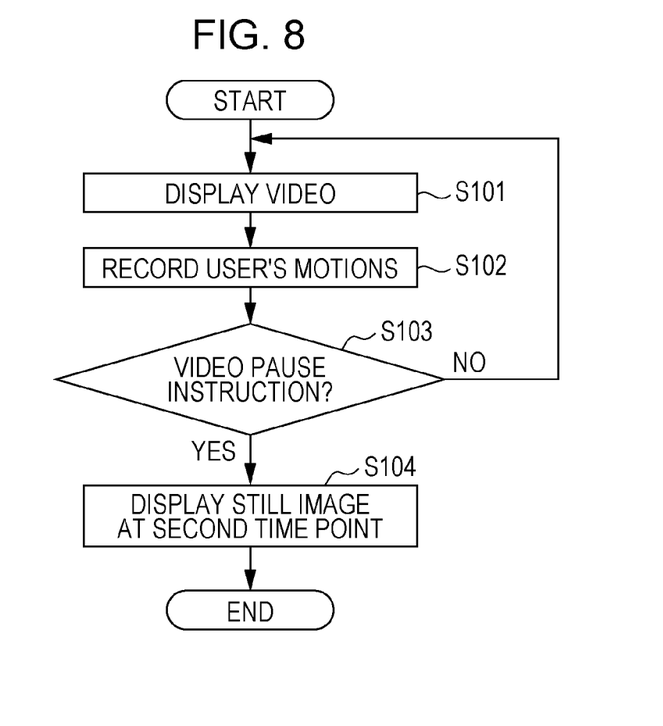
FIG. 8 is a flowchart illustrating a process by the information processing apparatus according to the first exemplary embodiment.

Actions of the information processing apparatus 10 according to this exemplary embodiment will be described. FIG. 8 is a flowchart illustrating a process by the information processing apparatus 10 according to the first exemplary embodiment. The process by the information processing apparatus 10 according to this exemplary embodiment is executed in such a manner that the CPU 11 reads the information processing program stored in the RAM 13 or the like.

In step S101, the CPU 11 functions as the display 102 and displays the video received from the engineer terminal 20.

In step S102, the CPU 11 functions as the recording unit 101 and records the motions of the user.

In step S103, the CPU 11 determines whether the video pause instruction given by pressing the video pause button 41 is received. If the video pause instruction is not received, the process returns to step S101. If the video pause instruction is received, the process moves to step S104.

In step S104, the CPU 11 functions as the display 102 and displays the still image displayed at the second time point.

As described above, the information processing apparatus 10 according to this exemplary embodiment may display, as a still image, a video frame displayed at the pause intention time point, in such a manner as to go back from the time point when the video pause instruction is actually received.

Figure 9:
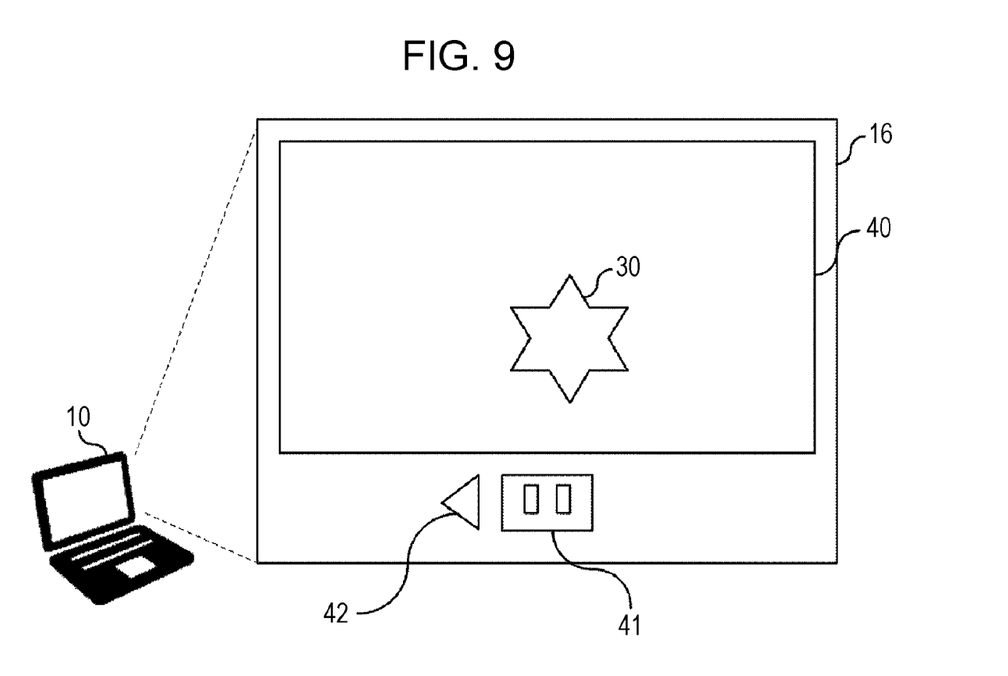
FIG. 9 is a view illustrating an example of the displaying of a screen by the information processing apparatus according to this exemplary embodiment that is provided with a slight rewind button.

In this exemplary embodiment, in response to pressing the video pause button 41, the display 102 automatically displays a still image in the video displayed at the second time point, not at the first time point. However, the display 102 may temporarily display the still image in the video displayed at the first time point. In a modification of this exemplary embodiment, a slight rewind button may be provided in addition to the video pause button 41. FIG. 9 is a view illustrating an example of the displaying of a screen by the information processing apparatus 10 according to this exemplary embodiment that is provided with the slight rewind button.

After displaying the still image in the video displayed at the first time point, the display 102 receives a still-image display instruction to display the still image in the video displayed at the second time point and displays the still image in the video displayed at the second time point.

In the case where a slight rewind button 42 illustrated in FIG. 9 is additionally provided in the modification in this exemplary embodiment, the display 102 first displays the still image in the video displayed at the first time point when the video pause button 41 is pressed. In the case where the user presses the slight rewind button 42 after the still image in the video at the first time point is displayed, the display 102 displays the still image in the video displayed at the second time point presumed to be a time point when the user intends pausing, in such a manner as to go back from the first time point.

Figure 10:
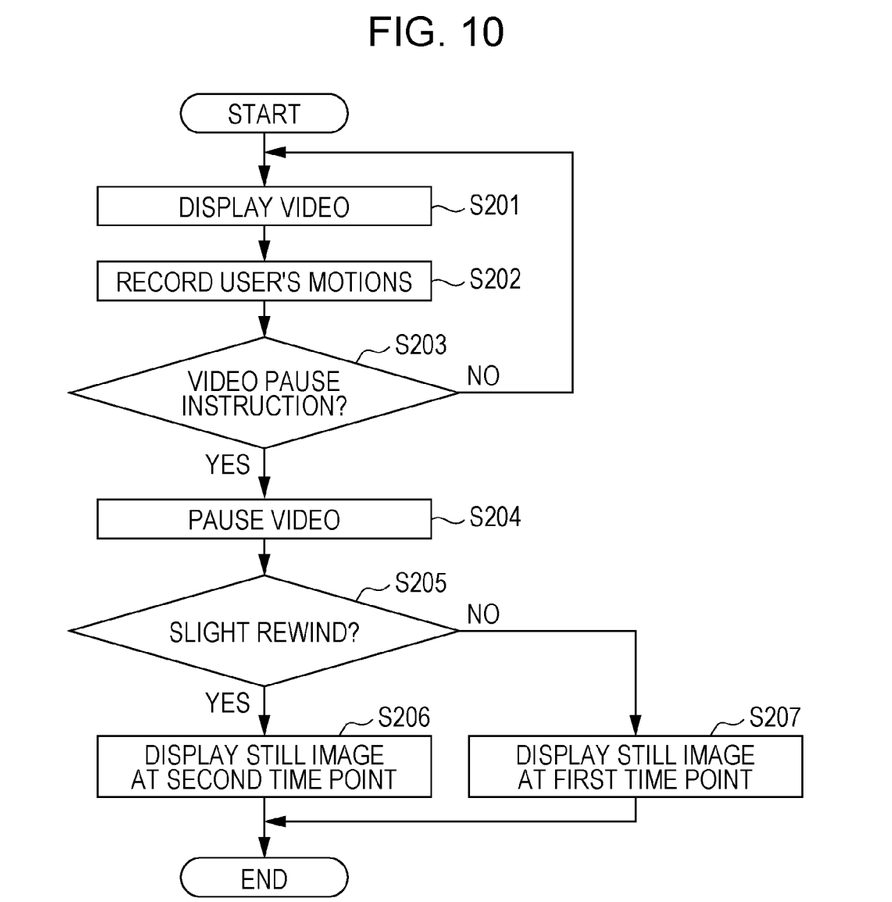
FIG. 10 is a flowchart illustrating a different example of the process by the information processing apparatus according to the first exemplary embodiment.

Actions of the information processing apparatus 10 according to this exemplary embodiment in the case where the slight rewind button 42 is additionally provided will be described. FIG. 10 is a flowchart illustrating a different example of the process by the information processing apparatus 10 according to the first exemplary embodiment. Like the foregoing flowchart, the process by the information processing apparatus 10 according to this exemplary embodiment is executed in such a manner that the CPU 11 reads the information processing program stored in the RAM 13 or the like.

Actions in steps S201 to S203 are common to those in steps S101 to S103 in the foregoing flowchart, and the description thereof is omitted.

In step S204, the CPU 11 functions as the display 102 and pauses the video at the time point when the video pause instruction is received.

In step S205, the CPU 11 determines whether the slight rewind button 42 is pressed. If the slight rewind button 42 is not pressed, the process moves to step S207. If the slight rewind button 42 is pressed, the process moves to step S206.

In step S206, the CPU 11 functions as the display 102 and displays the still image displayed at the second time point.

In step S207, the CPU 11 functions as the display 102 and displays the still image displayed at the first time point.

As described above, additionally providing the slight rewind button 42 enables the user to visually compare the still images in the video respectively displayed at the first time point and the second time point.

Second Exemplary Embodiment

A second exemplary embodiment will be described. For this exemplary embodiment, a case where multiple candidates for a still-image in the video are displayed will be described in detail. Note that an information processing apparatus 50 according to this exemplary embodiment is based on the information processing apparatus 10 according to the first exemplary embodiment. The components, functions, actions, and the like common to those of the information processing apparatus 10 according to the first exemplary embodiment are thus denoted by the same reference numerals as those in the first exemplary embodiment, and detailed description thereof is omitted.

The hardware configuration of the information processing apparatus 50 according to this exemplary embodiment is common to the hardware configuration of the information processing apparatus 10 according to the first exemplary embodiment illustrated in FIG. 5, and thus the description thereof is omitted.

The functional configuration of the information processing apparatus 50 according to this exemplary embodiment is also common to the functional configuration of the information processing apparatus 10 according to the first exemplary embodiment as illustrated in FIG. 6. The information processing apparatus 50 also includes the recording unit 101 and a display 202 as the functional units. Only different functions from those in the first exemplary embodiment are described, and the description of the functions common to those in the first exemplary embodiment is omitted.

Figure 11:
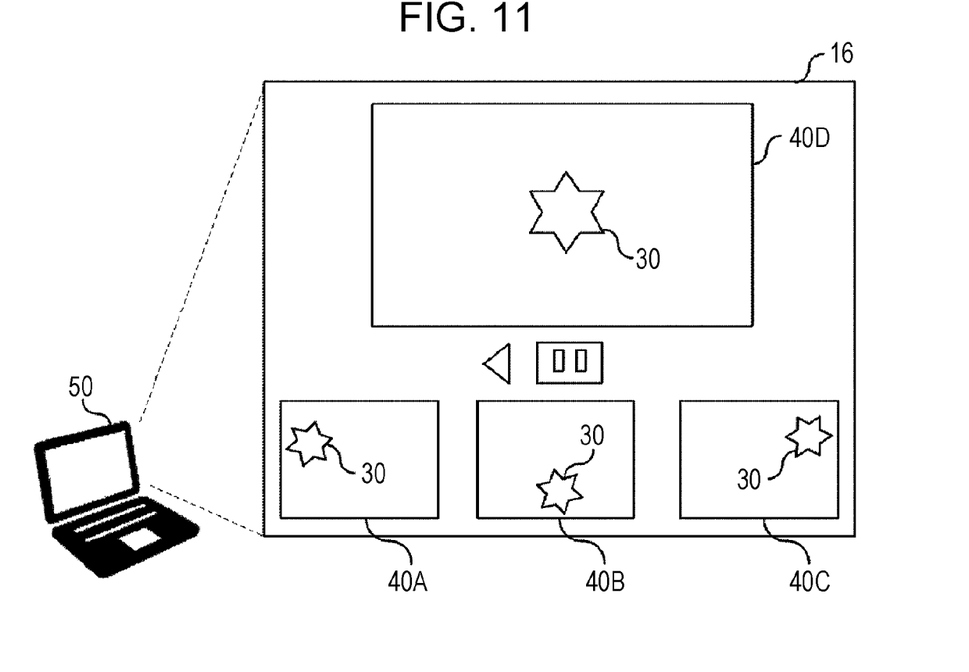
FIG. 11 is a view illustrating an example of the displaying of a screen by an information processing apparatus according to a second exemplary embodiment.

The display 202 displays multiple still-image candidates clipped from video displayed in a period including the second time point and extending from the second time point to the first time point.

FIG. 11 is a view illustrating an example of the displaying of a screen by the information processing apparatus 50 according to the second exemplary embodiment. Three still-image candidates in display areas 40A, 40B, and 40C are displayed on the monitor 16 of the information processing apparatus 50. The display 202 displays multiple still-image candidates clipped from the video displayed in the period including the second time point and extending from the second time point to the first time point on the monitor 16. In the example illustrated in FIG. 11, the three still-image candidates in the display areas 40A to 40C are displayed. However, the number of displayed still-image candidates is not limited to three. Clipping from the video displayed in the period including the second time point and extending from the second time point to the first time point may be performed at predetermined intervals.

The display 202 receives an instruction to select at least one of the still-image candidates and displays a selected still-image candidate as a still image. The user visually compares the still-image candidates respectively displayed in the display areas 40A to 40C illustrated in FIG. 11 and selects a still image displayed at a time point when the user's pause intention is reflected most appropriately. The display 202 receives the still-image-candidate selection instruction by the user and displays the still image selected by the user.

In the case where the monitor 16 has a touch panel function, the still-image-candidate selection instruction by the user is given by tapping the screen or the like. However, how the still-image-candidate selection instruction by the user is given is not limited to the tapping. The still-image-candidate selection instruction by the user may be a selection instruction given through a mouse pointer operation or keyboard input. In addition, the still image selected by the user may be displayed in a display area 40D in such a manner that the still-image candidates including the selected still image are also displayed on the monitor 16 as illustrated in FIG. 11, or only the still image selected by the user may be displayed on the monitor 16.

The display 202 also displays, as the still-image candidates, still images in the video respectively displayed at a fourth time point a predetermined time earlier than the second time point and at a fifth time point the predetermined time later than the second time point.

The fourth time point is a time point the predetermined time earlier than the second time point, and the fifth time point is a time point the predetermined time later than the second time point. For example, the predetermined time is set as two seconds, the display 202 displays, as still-image candidates, the still images in the video respectively displayed at a time point two seconds earlier than the second time point and a time point two seconds later than the second time point.

The display 202 recognizes the object 30 in the video displayed at the second time point and displays the still-image candidates including the object 30.

The display 202 recognizes the object 30 particularly drawing the user's attention in the video by using image recognition technology or the like. As a method for recognizing the object 30, not only the automatic recognition method using the image recognition technology but also a method in which the user optionally selects one of objects in the video may be used.

Figure 12:
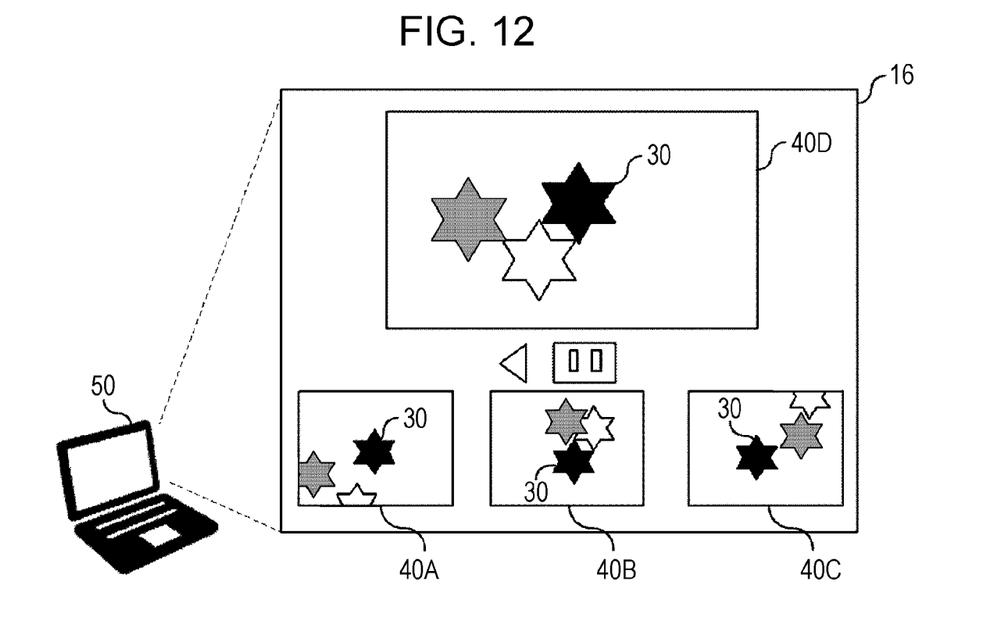
FIG. 12 is a view illustrating an example of the displaying of still image candidates in the video displayed at time points when a specific object is located in the center portion of the screen.

In addition, among still-image candidates, the display 202 displays still-image candidates representing the object 30 located in the center portion of the screen.

FIG. 12 is a view illustrating an example of the displaying of still image candidates in the video displayed at time points when a specific object is located in the center portion of the screen. In the example illustrated in FIG. 12, multiple objects in addition to the object 30 are displayed in the display area 40D. The display 202 recognizes the object 30 in the video displayed in the display area 40D of the monitor 16 and displays the still-image candidates each representing the object 30 located in the center portion of the screen in a corresponding one of the display areas 40A to 40C. In the still-image candidates in the display areas 40A and 40C illustrated in FIG. 12, the multiple objects that are not the object 30 are displayed without being completely included within the screen area, while the object 30 is displayed approximately in the center portion of the screen. In the display area 40B, the object 30 and the other objects are all located within the screen area, and in particular, the object 30 is located approximately in the center portion of the screen.

The state where the object 30 is located in the center portion of the screen denotes a state where when the entire screen is considered to be composed of multiple sections, the specific object 30 is superimposed on the section located in the center portion of the screen. The user may optionally change the range of the section located in the center portion of the screen.

Figure 13:
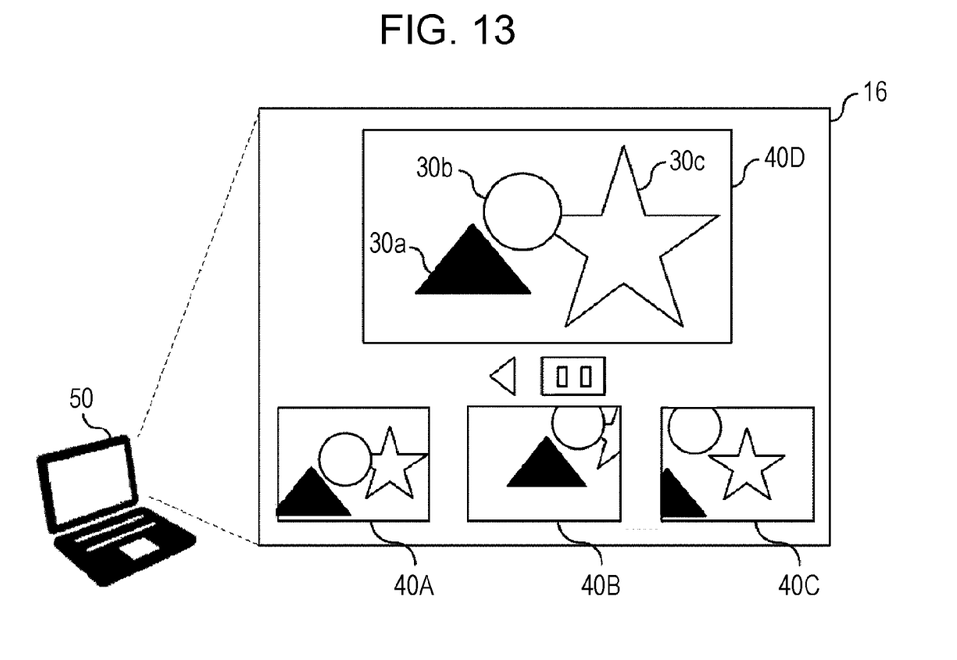
FIG. 13 is a view illustrating an example of displaying still image candidates in the video displayed at time points when one of objects is located in the center portion of the screen.

In addition, if there are multiple objects 30, the display 202 displays still-image candidates each representing the objects 30.

FIG. 13 is a view illustrating an example of displaying still image candidates in the video displayed at time points when one of objects is located in the center portion of the screen. The video displayed in the display area 40A of the monitor 16 in FIG. 13 includes three types of objects that are an object 30*a* of a triangular shape, an object 30*b* of a circle shape, and an object 30*c* of a star shape. As illustrated in FIG. 13, if there are the multiple objects 30, the display 202 displays still-image candidates each representing the objects 30*a* to 30*c*.

In FIG. 13, in the display area 40A displayed as one of the still-image candidates, a still image representing the object 30*b* is clearly displayed. In the display area 40B, each of the object 30*b* and the object 30*c* is not completely included within the screen area, but the object 30*a* is displayed in a state where the whole object 30*a* is easy to watch. In the display area 40C, each of the object 30*a* and the object 30*b* is not completely included within the screen area, but the object 30*c* is displayed in a state where the whole object 30*c* is easy to watch.

In the case where the objects 30 are the objects 30*a* to 30*c* of the three types as in the example illustrated in FIG. 13, the display 202 displays, as the still-image candidates, still images in the video displayed at time points when one of the three types of the objects 30*a* to 30*c* is easy to watch in turn. To recognize the multiple objects 30, the display 202 recognizes each object 30 by using the video recognition technology in the same manner as described above. The number of recognized object 30 is not limited to three.

Figure 14:
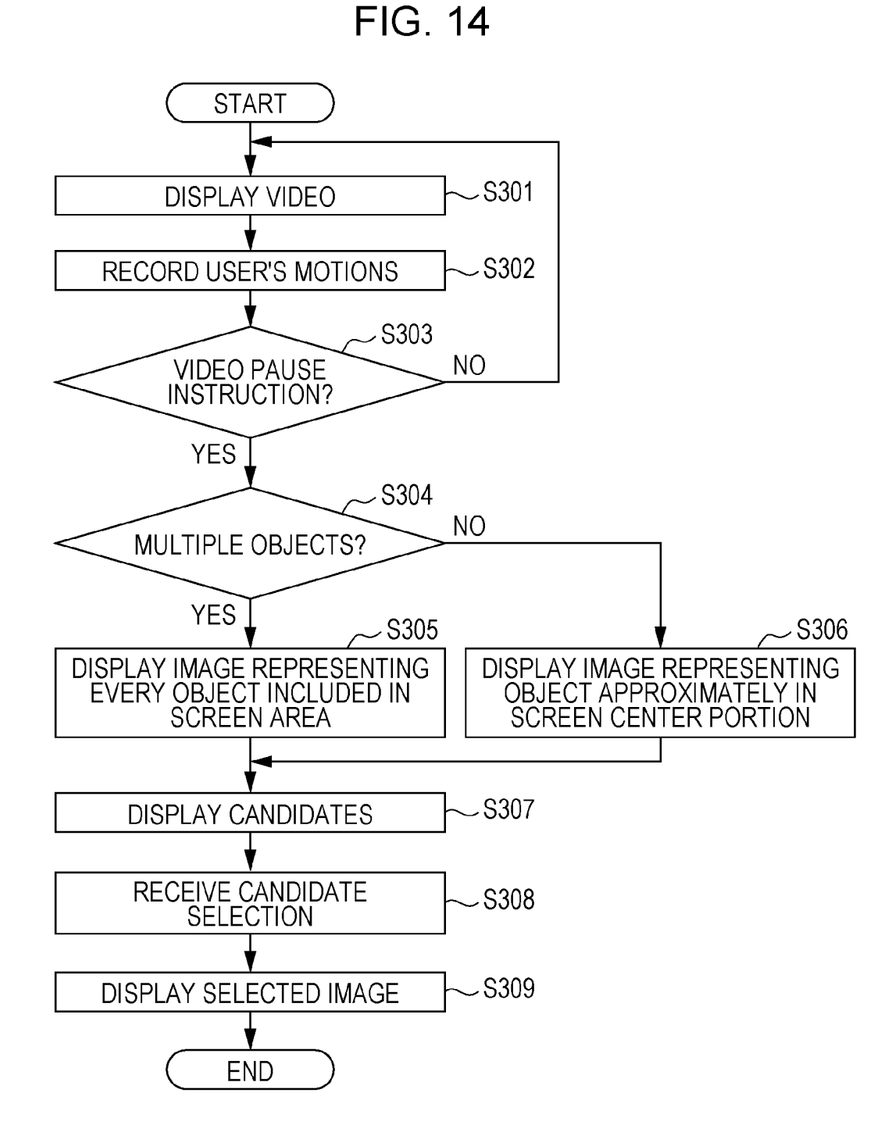
FIG. 14 is a flowchart illustrating a process by the information processing apparatus according to the second exemplary embodiment.

Actions of the information processing apparatus 50 according to this exemplary embodiment will be described. FIG. 14 is a flowchart illustrating a process by the information processing apparatus 50 according to the second exemplary embodiment. The process by the information processing apparatus 50 according to this exemplary embodiment is executed in such a manner that the CPU 11 reads the information processing program stored in the RAM 13 or the like.

Actions in steps S301 to S303 are common to those in steps S101 to S103 by the information processing apparatus 10 in the first exemplary embodiment, and the description thereof is omitted.

In step S304, the CPU 11 determines whether there are the multiple objects 30 in the video. If there are the multiple objects 30 in the video, the process moves to step S305. If there are not the multiple objects 30 in the video, the process moves to step S306.

In step S305, the CPU 11 functions as the display 202 and displays still-image candidates representing the multiple objects 30 included in the screen area.

If there is one object 30, the CPU 11 functions as the display 202 and displays, in step S306, the still-image candidates representing the object 30 located approximately in the center portion of the screen.

In step S307, the CPU 11 functions as the display 202 and displays multiple still-image candidates including the one or more still-image candidates displayed in previous step S306 or S305.

In step S308, the CPU 11 functions as the display 202 and receives the user's selection of one of the still-image candidates among the still-image candidates displayed in step S307.

In step S309, the CPU 11 functions as the display 202 and displays, as a still image, the still-image candidate selected by the user in step S308.

As described above, the display 202 recognizes the object 30 in the video and may thereby display a still image in the video displayed at a time point when the object 30 drawing the user's attention is easy to watch. The information processing apparatus 50 according to this exemplary embodiment displays multiple still-image candidates and thereby may display a still image in the video displayed at a time point closest to the pause intention time point among the multiple displayed still-image candidates.

For the first exemplary embodiment and the second exemplary embodiment, the following aspect is described taken as an example. Specifically, the engineer transmits the video to the expert. While watching the video, the expert performs the remote maintenance on the object 30 for the engineer. However, the information processing apparatus 10 and the information processing apparatus 50 may be applied to video such as a moving image generally and widely delivered. The video is not limited to video received in real time and is also applicable to video recorded in advance.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to:
   record a motion of a user made until a video pause instruction to pause displayed video is given; and
   display a still image in the video displayed at a second time point earlier than a first time point, the first time point being a time point at which the video pause instruction is received, the second time point being a threshold time point at which acceleration involved with the motion of the user first exceeds a predetermined threshold and which is a most recent threshold time point.

2. The information processing apparatus according to claim 1,
   wherein the processor is configured to:
   regard, as the second time point, the threshold time point at which the acceleration first exceeds the threshold in a period from the first time point back to a third time point a predetermined time earlier than the first time point and display the still image in the video.

3. The information processing apparatus according to claim 2,
   wherein the processor is configured to:
   after displaying a still image in the video displayed at the first time point, receive a still-image display instruction to display the still image in the video displayed at the second time point and display the still image in the video displayed at the second time point.

4. The information processing apparatus according to claim 3,
   wherein the processor is configured to:
   display a plurality of still-image candidates clipped from the video displayed in a period including the second time point and extending from the second time point to the first time point.

5. The information processing apparatus according to claim 4,
   wherein the processor is configured to:

receive an instruction to select at least one of the still-image candidates and display at least one selected still-image candidate as the still image.

6. The information processing apparatus according to claim 2,
wherein the processor is configured to:
display a plurality of still-image candidates clipped from the video displayed in a period including the second time point and extending from the second time point to the first time point.

7. The information processing apparatus according to claim 6,
wherein the processor is configured to:
receive an instruction to select at least one of the still-image candidates and display at least one selected still-image candidate as the still image.

8. The information processing apparatus according to claim 6,
wherein the processor is configured to:
display, as the still-image candidates, still images in the video respectively displayed at a fourth time point a predetermined time earlier than the second time point and a fifth time point the predetermined time later than the second time point.

9. The information processing apparatus according to claim 1,
wherein the processor is configured to:
after displaying a still image in the video displayed at the first time point, receive a still-image display instruction to display the still image in the video displayed at the second time point and display the still image in the video displayed at the second time point.

10. The information processing apparatus according to claim 9,
wherein the processor is configured to:
display a plurality of still-image candidates clipped from the video displayed in a period including the second time point and extending from the second time point to the first time point.

11. The information processing apparatus according to claim 10,
wherein the processor is configured to:
receive an instruction to select at least one of the still-image candidates and display at least one selected still-image candidate as the still image.

12. The information processing apparatus according to claim 1,
wherein the processor is configured to:
display a plurality of still-image candidates clipped from the video displayed in a period including the second time point and extending from the second time point to the first time point.

13. The information processing apparatus according to claim 12,
wherein the processor is configured to:
receive an instruction to select at least one of the still-image candidates and display at least one selected still-image candidate as the still image.

14. The information processing apparatus according to claim 12,
wherein the processor is configured to:
display, as the still-image candidates, still images in the video respectively displayed at a fourth time point a predetermined time earlier than the second time point and a fifth time point the predetermined time later than the second time point.

15. The information processing apparatus according to claim 12,
wherein the processor is configured to:
recognize an object included in the video displayed at the second time point and display the plurality of still-image candidates each including the object.

16. The information processing apparatus according to claim 15,
wherein the processor is configured to:
display a still-image candidate of the still-image candidates, the still-image candidate representing the object located in a center portion of a screen.

17. The information processing apparatus according to claim 15,
wherein the processor is configured to:
in response to presence of a plurality of the objects, display the still-image candidates each representing the objects.

18. The information processing apparatus according to claim 1,
wherein the processor is configured to:
reproduce the video from a time point of the displayed still image.

19. An information processing method comprising:
recording a motion of a user made until a video pause instruction to pause displayed video is given; and
displaying a still image in the video displayed at a second time point earlier than a first time point, the first time point being a time point at which the video pause instruction is received, the second time point being a threshold time point at which acceleration involved with the motion of the user first exceeds a predetermined threshold and which is a most recent threshold time point.

20. A non-transitory computer readable medium storing a program causing a computer to execute a process, the process comprising:
recording a motion of a user made until a video pause instruction to pause displayed video is given; and
displaying a still image in the video displayed at a second time point earlier than a first time point, the first time point being a time point at which the video pause instruction is received, the second time point being a threshold time point at which acceleration involved with the motion of the user first exceeds a predetermined threshold and which is a most recent threshold time point.

* * * * *